(12) United States Patent
Kim

(10) Patent No.: US 10,616,614 B2
(45) Date of Patent: Apr. 7, 2020

(54) METHOD OF PROVIDING A COMPLEX CONTENT INCLUDING AN ADVERTISEMENT CONTENT AND A PORTABLE STORAGE MEDIUM THEREFOR

(71) Applicant: Dongwoon International Co., Ltd., Seoul (KR)

(72) Inventor: Dong Cheol Kim, Seoul (KR)

(73) Assignee: Dongwoon International Co., Ltd., Seoul (KR)

( * ) Notice: Subject to any disclaimer, the term of this patent is extended or adjusted under 35 U.S.C. 154(b) by 67 days.

(21) Appl. No.: 15/027,872

(22) PCT Filed: Nov. 19, 2015

(86) PCT No.: PCT/KR2015/012484
§ 371 (c)(1),
(2) Date: Apr. 7, 2016

(87) PCT Pub. No.: WO2017/086509
PCT Pub. Date: May 26, 2017

(65) Prior Publication Data
US 2018/0041786 A1 Feb. 8, 2018

(51) Int. Cl.
*H04N 21/234* (2011.01)
*G06Q 30/02* (2012.01)
(Continued)

(52) U.S. Cl.
CPC ....... *H04N 21/23424* (2013.01); *G06Q 30/02* (2013.01); *G06Q 30/0251* (2013.01);
(Continued)

(58) Field of Classification Search
None
See application file for complete search history.

(56) References Cited

U.S. PATENT DOCUMENTS

| 9,104,669 B1* | 8/2015 | Des Jardins | G06F 16/40 |
| 2004/0003397 A1* | 1/2004 | Boston | H04N 5/76 725/34 |
| 2004/0214551 A1 | 10/2004 | Kim | |
| 2007/0244688 A1* | 10/2007 | Bangalore | G06F 17/289 704/3 |

(Continued)

FOREIGN PATENT DOCUMENTS

| KR | 10-2002-0024719 A | 4/2002 |
| KR | 10-2002-0075568 A1 | 10/2002 |
| KR | 10-2009-0079563 A | 7/2009 |
| KR | 10-1501259 B1 | 3/2015 |

OTHER PUBLICATIONS

International Search Report in International Application No. PCT/KR2015/012484, filed Nov. 19, 2015.

*Primary Examiner* — Michael R Telan
(74) *Attorney, Agent, or Firm* — Nelson Mullins Riley & Scarborough LLP; Kongsik Kim, Esq.

(57) ABSTRACT

This invention relates to a method for providing a complex content including an advertisement content and a portable storage medium therefor. The method of providing a complex content including an advertisement content comprises: transmitting a decoding request signal to a server providing a decoding information for playing a multimedia content stored in the portable storage medium according to connecting the portable storage medium, receiving the decoding information for playing from the server, manipulating the multimedia content and the advertisement content corresponding to the multimedia content, and playing a complex content generated by manipulating the multimedia content and the advertisement content.

9 Claims, 11 Drawing Sheets

(51) Int. Cl.
   *H04N 21/41*     (2011.01)
   *H04N 21/414*    (2011.01)
   *H04N 21/258*    (2011.01)
   *H04N 21/4405*   (2011.01)
   *H04N 21/81*     (2011.01)
   *H04N 21/235*    (2011.01)
   *H04N 21/254*    (2011.01)
   *G06Q 50/10*     (2012.01)

(52) U.S. Cl.
   CPC ..... *G06Q 30/0254* (2013.01); *G06Q 30/0277* (2013.01); *H04N 21/2353* (2013.01); *H04N 21/2541* (2013.01); *H04N 21/25816* (2013.01); *H04N 21/4135* (2013.01); *H04N 21/41407* (2013.01); *H04N 21/4405* (2013.01); *H04N 21/812* (2013.01); *G06Q 50/10* (2013.01)

(56) References Cited

U.S. PATENT DOCUMENTS

| | | | |
|---|---|---|---|
| 2008/0083035 A1* | 4/2008 | Dong | H04N 5/913 726/26 |
| 2009/0307721 A1* | 12/2009 | Afram | H04N 5/44543 725/34 |
| 2011/0010545 A1* | 1/2011 | Kill | G06F 21/10 713/168 |
| 2011/0164753 A1* | 7/2011 | Dubhashi | H04N 21/2541 380/282 |
| 2012/0079010 A1* | 3/2012 | Song | H04N 21/25808 709/203 |
| 2014/0098289 A1* | 4/2014 | Jang | G11B 27/105 348/441 |
| 2015/0023652 A1* | 1/2015 | Harjanto | H04N 21/23424 386/249 |

\* cited by examiner

METHOD OF PROVIDING A COMPLEX CONTENT INCLUDING AN ADVERTISEMENT CONTENT AND A PORTABLE STORAGE MEDIUM THEREFOR

CROSS-REFERENCE TO RELATED APPLICATION

This application is the U.S. national stage application of International Patent Application No. PCT/KR2015/012484, filed Nov. 19, 2015, the disclosure of which is incorporated herein by reference in their entirety.

BACKGROUND OF THE PRESENT INVENTION

1. Field of the Present Invention

The present invention relates to a providing a multimedia content, more particularly, to a technique of providing complex content synthesized advertisement content in multimedia content.

2. Description of the Related Art

In general, the video advertisement by using a means, such as a specific storage medium, e.g., CD has been made a particular advertisement or promotion. The above-described storage medium as to promote products of a particular supplier and configured to facilitate the distribution and to have a compact structure. The advertisement content is stored in such a storage medium.

Therefore, the user can be exposed by the advertisement content so that can have a compensation according to certain rules, being used as part of an advertisement methods, what to watch advertisement content simultaneously while watching a DB content through their computers.

According to provide the functionality of the electronic catalog using promotional materials formed by storage medium, such as CD-ROM, DB content that serves as a useful independent product to the user leads to the exchange e-commerce of complex way subjecting to the discount with rate of the exposure to advertisement content using a useful DB content.

However, as described above, advertisement using a storage medium such as a CD has limitation in that user should use the storage medium such as a CD to reproduce the content regardless of advertisement content, and Its portability and ease of use is the lack off. In addition, there is a limitation to provide a customized advertising to the individual user contacted advertisings.

SUMMARY OF THE PRESENT INVENTION

The present invention provides a method of providing a complex content including an advertisement content for targeted customers by using a multimedia content stored in the portable storage medium being portable convenient to provide the advertisement content corresponding to the multimedia content, and a portable storage medium therefor.

The present invention provides a method of providing a complex content synthesized advertisement content comprising: transmitting a decoding request signal to a server which providing a decoding information for playing the multimedia content stored in the Portable storage medium according to connecting a Portable storage medium; receiving said decoding information for playing from the server; and synthesizing the multimedia content with advertisement content corresponding to the multimedia content and playing the complex content synthesized by the multimedia content and the advertisement content.

According to an embodiment of the present invention, the adverting content with the multimedia content is synthesized by receiving the advertisement content matched with the content of the multimedia content from the Portable storage medium or the server.

The step of synthesizing the advertisement content and the multimedia content includes determining at least one of position or time to play the advertisement content matched with the metadata of the multimedia content, and synthesizing the multimedia content with the advertisement content according to the determined result.

The step of synthesizing with the advertisement content to multimedia content includes synthesizing on part of the content screen area of multimedia content with the advertisement content matched to the content of the multimedia content.

The method for providing complex content including the advertisement content further comprises the step of synthesizing the translating content of multimedia content, and synthesis the multimedia content with the synthesized translated content and advertisement content The method for providing complex content including the advertisement content further comprises the step of synthesizing a copy protection information for preventing unauthorized copying of the complex content, and playing the complex content synthesized with the copy protection information.

The method for synthesizing the copy protection information includes generating the copy protection information to synthesize the complex content; converting the copy protection information in the same format as the complex content; and synthesizing the complex content and the converted copy protection information.

As for converting the copy protection information in the same format as the complex content, in a case where the complex content is applicable to any one of the audio content, still image content and video content, the copy protection information may convert to in the format of the complex content.

Wherein playing the complex content, the advertisement content includes a network address of the advertisement server that provides the advertisement content, and the computing device may perform the network connection operation with the advertisement server during playing of the complex content in case of the advertisement server linked by the network address.

According to another embodiment of the present invention includes the method to provide complex content synthesized with advertisement content, receiving a decoding request signal of a playback decoding information for playing multimedia content from a computing device; accessing the advertisement content corresponding multimedia content according to receiving said decoding request signal; transmitting said accessed advertisement content and the playback decoding information to the computing device.

The playback decoding information may include information generated by the at least one symmetric key algorithms and asymmetric key algorithms.

The accessing step of the multimedia content and the advertisement content includes accessing the advertisement content matched at least one of the content of the multimedia content and metadata.

According to another embodiment of the present invention includes the method to provide complex content synthesized with advertisement content, acquiring content address information for multimedia content from the Portable storage medium according to connecting a Portable storage medium; transmitting the content request signal for multimedia content corresponding to the obtained content address information; receiving the complex content synthesized with the multimedia content and advertisement content from the server; and playing the received complex content.

The advertisement content may be matched to at least one of content and metadata of the multimedia content, and the complex content may include copy protection information Wherein playing the complex content; the advertisement content includes a network address of the advertisement server that provides the advertisement content, and the network connection operation may be performed the advertisement server during playing of the complex content in case of the advertisement server linked by the network address.

According to another embodiment of the present invention includes the method to provide complex content synthesized with advertisement content, receiving a content request signal of the playback decoding information for playing multimedia content from a computing device; accessing the advertisement content corresponding multimedia content; transmitting the synthesized advertisement content and the multimedia content to the computing device.

The accessing step of the multimedia content and the advertisement content includes accessing the advertisement content matched at least one of the multimedia content of the content and metadata.

Wherein the step of synthesizing with the advertisement content to the multimedia content includes determining one of position or time to play the advertisement content matched with the metadata of the multimedia content, and synthesizing the multimedia content to the advertisement content according to the determined result.

Wherein the step of synthesizing with the advertisement content to multimedia content includes synthesizing on the screen of the part of the content area of multimedia content to the advertisement content matched to the content of the multimedia content.

Wherein the method for providing complex content including the advertisement content further comprises the step of synthesizing the translating content of multimedia content, and synthesis with the multimedia content synthesized the translated content to advertisement content Wherein the method for providing complex content including the advertisement content further comprises the step of synthesizing a copy protection information for preventing unauthorized copying of the complex content, and can reproduce the complex content synthesized the copy protection information.

The method for synthesizing the copy protection information includes generating the copy protection information to synthesize the complex content; converting the copy protection information in the same format as the complex content; and synthesizing the complex content and the converted copy protection information.

Wherein the converting the copy protection information in the same format as the complex content, in a case where the complex content are applicable to any one of the audio content; still image content and video content, the copy protection information may convert to in the format of the complex content.

According to another embodiment of present invention, the Portable storage medium connected to computing device stores the multimedia content and advertisement content, and stores the address information of the server which provides the playback decoding information about the multimedia content, provides said server address information according to the connected computing device request to computing device, provides multimedia content and the advertisement content for the generation of complex content in the computing device.

The Portable storage medium may provide said advertisement content matched at least one of content and metadata of the multimedia content.

The advertisement content includes a network address of the advertisement server that provides the advertisement content, and said network address is linked with advertisement server so that the computing device can perform the network connection operation with advertisement server during playing of the complex content.

DETAILED DESCRIPTION OF THE PRESENT INVENTION

Figure 1:
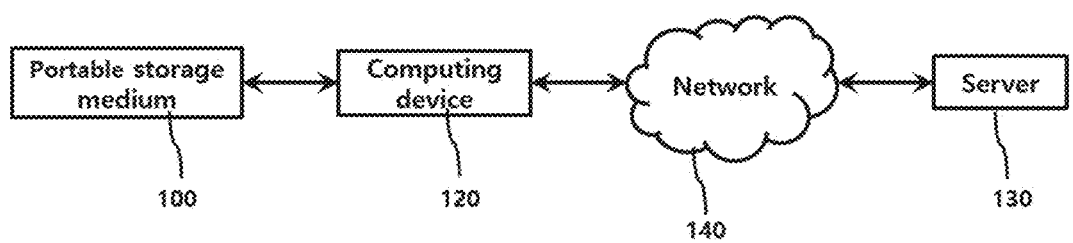
FIG. 1 shows network environment to present a method of providing multiple content including advertisement content according to the embodiment of the present invention.

The present invention will now be described more fully with reference to the accompanying drawings, in which exemplary embodiments of the present invention are shown.

The present invention may, however, be embodied in many different forms and should not be construed as being limited to the embodiments set forth herein; rather these embodiments are provided so that this disclosure will be thorough and complete, and will fully convey the concept of the present invention to one of ordinary skill in the art. Meanwhile, the terminology used herein is for the purpose of describing particular embodiments only and is not intended to be limiting of exemplary embodiments.

Also, thickness or sizes of layers in the drawings are exaggerated for convenience of explanation and clarity, and the same reference numerals denote the same elements in the drawings. As used herein, the term "and/or" includes any and all combinations of one or more of the associated listed items.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The present invention will now be described more fully with reference to the accompanying drawings, in which exemplary embodiments of the invention are shown. In the drawings, for example, sizes and shapes of members may be exaggerated for clarity and convenience of explanation. Accordingly, the shapes may be modified actually. Accordingly, it should not be construed as being limited to specific shapes of regions.

FIG. 1 shows the network environment to present a method of providing multiple content including adverting content according to the embodiment of the present invention. Referring to FIG. 1, the network environment includes a portable storage medium (100), a computing device (120) and a server (130)

Portable storage medium (100) comprises a device including various portable memory element and stores various content.

A portable storage medium (100) may store the multimedia content and/or advertisement content. Moreover, the portable storage medium (100) may store the address of the server that provides the decoding information to play multimedia content, or may store the content address information about the multimedia content. Thus, the portable storage medium (100) may provide the server address or content address information to the computing device (120) according to the request of the computing device (120). The portable storage medium (100) may provide the multimedia content and advertisement content for producing complex content in the computing device (120). In particular, the portable storage medium (100) is able to provide advertisement content matching the multimedia content and metadata to the computing device (120). In this case, the advertisement content provided the computing device (120) may include a network address of the advertisement server that provides advertisement content. In addition, the network address may be linked to the advertisement server so that the computing device (120) can perform network connection operation during playing of complex content.

A portable storage medium (100), may include USB (Universal Serial Bus) memory, a memory card, an external hard devices (SSD, Solid State Drive) and a variety of disk device (CD). The portable storage medium (100) is composed of a NAND or NOR memory of a predetermined capacity, and a flash memory for storing any information, such as a flash memory devoting a part of area, or be implemented as a separate memory structure. Also, the Portable storage medium (100) may comprise variety interface modules connectable to the computing device (120).

The computing device (120) connected to the Portable storage medium (100) may execute a variety of content stored the Portable storage medium (100). In particular, the computing device (120) is able to play multimedia content based on the information provided by the Portable storage medium (100). Computing device (120) comprises an interface module for connecting with a Portable storage medium (100), in particular may include a variety of hardware connecting ports according to the type of Portable storage medium (100). Computing device (120) recognizes the connection in case of connecting to the Portable storage medium (100), and checks the information stored in the Portable storage medium (100) by means of a plug-and-play function according to the result of recognition and is allowed to view or play the complex content.

The computing device (120) may comprise such as a desktop computer, a laptop computer, tablet PC, a wireless telephone, a mobile phone, smart phone, smart Watch, smart glass, PMP (portable multimedia player), a portable game machine, a navigation device, a digital camera, a digital audio tape recorder, a digital audio player, digital video recorders, digital video player, digital video recorders, digital video players The server (130) is connected to the computing device (120) through wire or wireless network (140) and is responsible for processing information to play multimedia content which is combined with advertisement content. Server (130) may include a database that stores multimedia content and advertisement content. In addition, the server (130) may include an additional server to manage only independently the advertisement content.

Here, the wired network (140) may comprise a LAN (local area network), WAN (wide area network) or a wired Internet, and the like. In addition, the wireless network (140) is mobile internet network like WiFi (wireless fidelity) and WiBro (wireless broadband internet) or WiMax (world interoperability for microwave access), mobile communication network like WCDMA (wideband code division multiple access), CDMA2000 and 3G mobile communication network like LTE (long term evolution) network, LTE—Advanced, or 4G mobile communication network, and 5G.

Hereinafter, specific details of the operation of a portable storage medium (100), computing device (120) and server (130) will be described.

Figure 2:
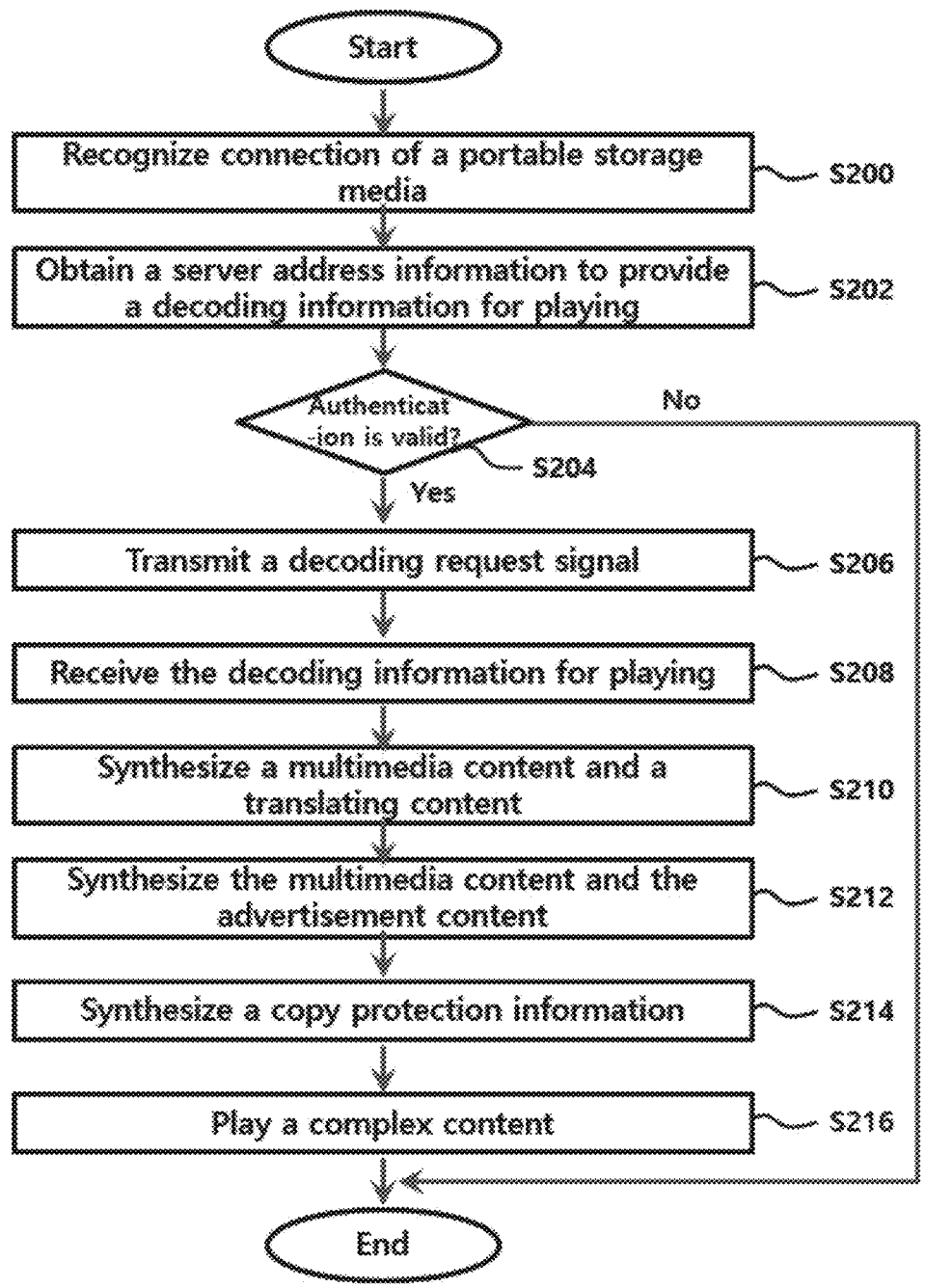
FIG. 2 is a flow chart to present a method of providing multiple content including adverting content according to the embodiment of the present invention.

FIG. 2 is a flowchart illustrating an embodiment provided the complex content including the advertisement content according to the embodiments of the present invention. FIG. 2 disclosures the method for providing multiple content performed in a portable storage medium (100) connected to a computing device (120).

First, the computing device (120) recognizes the event of connection of portable storage media (100) (S200). The portable storage medium (100) is inserted into the connection port of the computing device (120), or in the case of connection via the interface module, the computing device (120) is aware of an event signal according to the connection of the Portable storage medium (100).

After step S200, the computing device (120) obtains the server address information providing the playback decoding information of multimedia content stored on a Portable storage medium (100) (S202). Portable storage medium (100) may store the multimedia content and, as well, stores the address information of the server that provides the playback decoding information for playing of the multimedia content. Multimedia content may comprise a variety of video information, still image information, and the like. For example, multimedia content can be golf, billiards, ski, tennis, a variety of sports, the associated training videos or still video, English conversation, Korean conversation, tourist information, drama, learning video, still video, or movies. In addition, the multimedia content may include content that produces for a particular customer targeted according to the user's business, or business purposes. On the other hand, the address information of server includes the network address (for example, URL (uniform resource locator) address) of server that stores the multimedia content and identification information to access the playback decoding information.

After step S202, the computing device (120) performs an authentication procedure to access the server corresponding to the obtained address information (S204). Information about the II) and password for the authentication process may be stored already on the Portable storage medium (100) and may be assigned to user through the registering the server (130). Information about the user such as a user ID and password inputted via the computing device (120) is sent to the server (130). In the server (130), ID and password for authentication procedure is compared with the registered information. If the registered information matches with the received ID, the server (130) determines that the authentication process is valid and transmits a response message indicating that the authentication process is valid to the computing device (120), if the registered information does not match, the server (120) transmits an error message. However, the authentication process described above is not necessarily required for the procedure, it may be omitted to perform the authentication process as needed.

In step S204, if the authentication process is valid, the computing device (120) transmits the decoding request signal for requesting the playback decoding of the multimedia content to server (120) corresponding to the address information (S206). Decoding request signal is a signal for requesting the decoding information for playing the multimedia content. Multimedia content stored in the Portable storage medium (100) is coupled to the playback encryption information. Since the multimedia content combined the playback encryption information may be reproduced by the playback decoding information, the computing device (120) transmits the decoding request signal to the server (130). The decoding request signal may include identification information for identifying the multimedia content. According to a reception of the decoding request signal the server (130) transmits the decoding playback signal corresponding to the identification information of the multimedia content to the computing device (120). In addition, the server (130) accesses the advertisement content corresponding to the multimedia content, the accessed advertisement content may send to the computing device (120). However, if the advertisement content is stored based on a Portable storage medium (100), the server (130) may omit the access of the advertisement content and transmission to the computing device (120).

After step S206, the computing device (120) receives the playback decoding information from server (30) (S208). In addition, the computing device (120) may receive the advertisement content corresponding to the multimedia content from the server (130). Playback decoding information is information to playing the playback encryption information coupled with multimedia content. As the playback decoding information decodes the decoding encryption information, the multimedia content can reproduce. The playback decoding information may include information generated by a symmetric key algorithm, or an asymmetric key algorithm. Symmetric key algorithm is to share the same encryption key for the encryption and decryption keys, asymmetric key algorithm is a method of encryption and decryption using a public key and private key, respectively. Advertisement content may include targeted advertisement content about a target object associated with a general advertisement content and multimedia content provided from outside client requesting the advertisement. General advertisement content may include a video, still image, text, images, etc. to be inserted in the multimedia content regardless of the genre, such as finance, education, sports, fashion, food. In addition, targeted advertisement content is a content that are associated with the multimedia content, for example, if the multimedia content is in a golf video, advertisement content is relating to golf equipment, if multimedia content is lesson scene using a unique product in playback screen (for instance, the 'drivers' distance improving lesson scene), the advertisement content may be associated with this driver's products.

After step S208, the computing device (120) synthesizes the multimedia content to the translated content about the multimedia content according to the received playback decoding information (S210). The computing device (120) accesses the multimedia content stored in the Portable storage medium (100). Then, the computing device (120) decodes the encrypted multimedia content using the received playback information. Then, the computing device (120) may access the translating content stored in a portable storage medium (100), and the decoded multimedia content synthesis to the translated content. However, multimedia content and the translating content may be accessed at the same time, or may also be accessed with a time lag.

The translated content can be foreign language translating information matching the voice information and text information of the multimedia content. Translating content include a foreign language translating of voice or text (subtitles) exposed when the multimedia content playback, and include content being the various forms accordingly, according to the target of marketing customer such as English, Japanese, Chinese, Arabic, German belongs. This translating content may be stored in a Portable storage medium (100). For the translated content is synthesized with the multimedia content, the synchronized information of the translated content and multimedia content may be previously stored in a Portable storage medium (100). However, the step of synthesizing the translated content to the multimedia content is not an essential step, it can be omitted, if necessary.

After step S210, the computing device (120) synthesizes the multimedia content to advertisement content corresponding to the multimedia content (S212). Advertisement content corresponding to multimedia content may be stored in a Portable storage medium (100), or may be provided from the server (130). Advertisement content corresponding to multimedia content can be matched with the content information of the multimedia content, or the content can be matched with the metadata of the multimedia content. Here, the content information of the multimedia content may include information such as the content title, content information, characters, place. The meta data of the multimedia content includes a playback time of the multimedia content, resolution, bit rate, codec information, GOP (Group of Picture) information. In particular, the metadata of the multimedia content may comprise information such as a time information according to content, index information for each scene (the frame) of the multimedia content. Metadata of the multimedia content may comprise information such as a color difference signal, a luminance signal or a change signal of motion picture for the multimedia content. In addition, metadata of the multimedia content may comprise a peak signal, a range signal or peak change signal for audio information of the multimedia content.

For synthesizing the advertisement content and the multimedia content, the computing device (120) determines playback time and/or duration of the advertisement content matching the content information or the metadata of the multimedia content, and it can be synthesized in the multimedia content and advertisement content according to the determined result. Information about the content information or the metadata of the multimedia content are stored in the Portable storage medium (100) or are provided from the server (130), or terminal (120). Computing device (120) is stored in the Portable storage medium (100), the advertisement content can be synthesized corresponding to multimedia content using the content information or the metadata of the multimedia content provided from the terminal (120) or the server (130).

On the other hand, when the content information or the metadata of the multimedia content has not yet been stored in the Portable storage medium (100) or is not provided from the terminal (120) or the server (130) computing device (120) extracts information such as multimedia title, characters, places corresponding to the content information of the multimedia content from multimedia content, or extracts information such as the playback time corresponding to the metadata of the multimedia content, resolution, bit rate, codec information, GOP information, the time slot information for each scene, or index information. Then, the computing device (120) accesses the advertisement content using the extracted content information or metadata of multimedia content and may be synthesized accessed the advertisement content and multimedia content.

For example, the computing device (120) may determine the playback position by playing adverting content before multimedia content, or by playing the advertisement content after playing of the multimedia content when playing of the multimedia content. In addition, the computing device (120) may determine a playback duration of the advertisement content such as 10 [sec], 30 [sec] and 60 [sec] when the multimedia content is playing. The computing device (120) may determine to synthesizing the advertisement content highly associated with the content of multimedia content at a particular time by comparing the advertisement content and the multimedia content. Computing device (120) may also classify the providing multimedia content as a scene in unit of time and determine the playback position so that advertisement screen is provided such as about 1 or 2 [sec] spot after scene matching with intended advertisement content. In addition, computing device (120) may synthesize the advertisement content matching the content of the multimedia content on a portion of the content of the multimedia content. The computing device (120) may determine to synthesis the advertisement content at certain zone such as the upper side, lower side, left side or right side within playback screen of the multimedia content.

After step S212, the computing device (120) may synthesize the complex content with copy protection information to prevent unauthorized copying of the multimedia content (S214). However, the synthesis phase of the copy protection information may be omitted, if necessary.

As a method of DRM (Digital Rights Management) for the content right protection, a scheme synthesizing a copy protection information can be presented for preventing unauthorized copying of the content. In other words, illegal copying is prevented by inserting the copy protection information to the multimedia content such as educational content, learning lessons, and the relevant content, or the display may be displayed using a dedicated content player.

Figure 3:
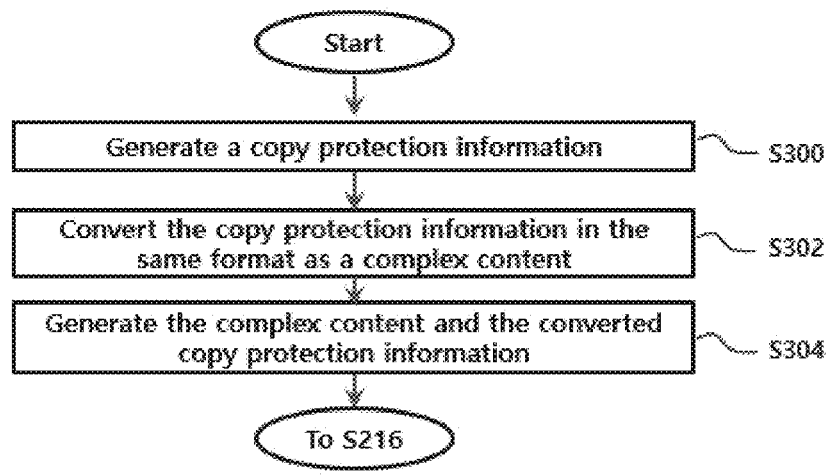
FIG. 3 is a flow chart to present the process of synthesizing copy protection information to the multiple content according to the embodiment of the present invention.

FIG. 3 is a flow chart illustrating a process of synthesizing a copy protection information in the complex content.

Computing device (120) generates the copy protection information to synthesize the complex content (S300). The computing device (120) may generate information such as the usage method of content related to multimedia content, limiting condition for content usage, encryption methods, encryption key and the length of encryption.

After step S300, the computing device (120) converts the copy protection information in the same format as the complex content (S302). As the format of the multimedia content is classified by the audio content, still image content, and video content, the computing device (120) may convert the copy protection information synthesized with the multimedia content so that do corresponding this format.

After step S302, the computing device (120) synthesizes the converted copy protection information with the complex content (S304). Computing device (120) may synthesize the copy protection information converted as the same format as the multimedia content to digital content with watermarking technique and the like.

For example, when the multimedia content is an audio content the computing device (120) synthesizes the copy protection information in the form of audio in the multimedia content with a sound watermarking technique. Copy protection information of the audio form is generated as form of difficult to hear ear of person who is not feel a change of sound accordingly, even if the copy protection information is synthesized. This copy protection information of audio form can be extracted via a speech recognition technique in the dedicating playback apparatus of the multimedia content.

In addition, when the multimedia content is still image content, the computing device (120) synthesizes the copy protection information of a still image in multimedia content with the image watermarking technique. Since the copy protection information in the form of still image is not generated as visible to human's eye, the person is hardly notice the change the still image form even if the copy protection information is synthesized. This copy protection information in the form of still images can be extracted through the image recognition technique in the dedicating playback apparatus of the multimedia content.

In addition, when the multimedia content is video content, the computing device (120) synthesizes the copy protection information of a still image with an image watermarking form in each video frame corresponding multimedia content. Since the copy protection information in the multimedia content are converted in the same format as the digital content and synthesized by the watermarking technique, it can prevent unauthorized copying of multimedia content from a malicious user.

Figure 4:
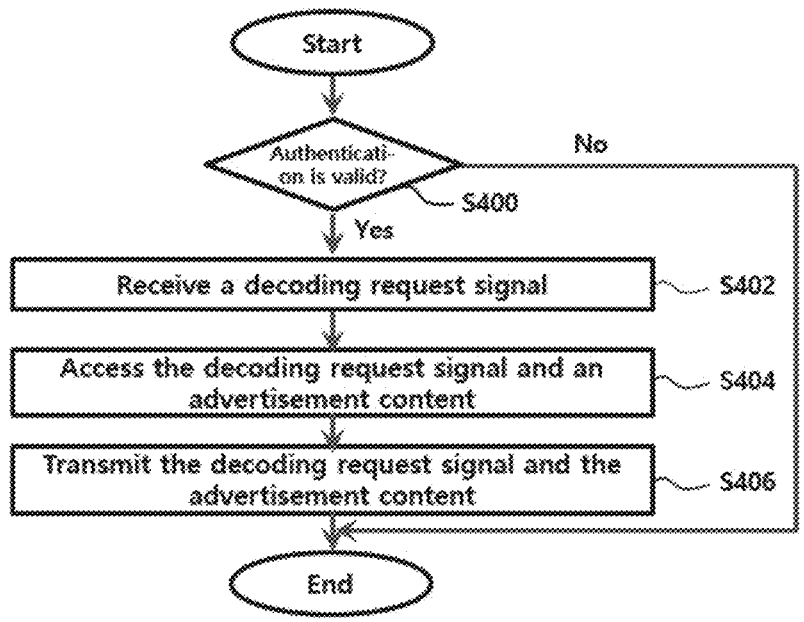
FIG. 4 is a flow chart to present a method of providing multiple content including adverting content according to another embodiment of the present invention.

After the above-described step S214, the computing device (120) reproduces complex content synthesized by the multimedia content and the advertisement content (S216). At this time, the computing device (120) may perform the network connection operation for the advertisement server providing advertisement content during the process of playback a complex content. The advertisement server may be the same as those of the above described server (130), or the server (130) may be a web server which provides separately detailed information of advertisement content. Advertisement content may include a network address of the advertisement server that provides advertisement content. In addition, the advertisement server is linked by a network address. The computing device (120) may connect a sales site or sites information relating to the advertisement content in association with the advertisement server that the can communicate in a wired or wireless connection with user even during playing of the multimedia content FIG. 4 is a flowchart illustrating the method of providing the complex content including the advertisement content according to another embodiment of the present invention. It discloses method of providing the complex content performed in a server (130) associated with computing device (120).

The server (130) performs an authentication procedure for the computing device (120) accessing to the server (130) (S 400). If user inputting the user ID and a password are sent from the computing device (120) to server (130), the server (130) compares the previously registered information with the transmitted ID and password for the authentication process. The previously registered information and the received ID and password are determined to match, the server (130) transmits a response message indicating that the authentication process is valid to the computing device (120). However, the authentication process described above is not necessarily required for the procedure, it may be omitted to perform the authentication process as needed.

After step S400, if the authentication process is valid, the server (130) receives the decoding request signal from the computing device (120) (S402). Decoding request signal is a signal requesting playback decoding information for playing of multimedia content. Decoding request signal may include identification information for identifying the multimedia content.

After step S402, the server (130) may access the advertisement content corresponding to the playback decoding information and/or multimedia content requested by the decoding request signal (S404). Server (130) stores information about the playback decoding of information and advertisement content to a database. Server (130) may access the playback decoding information based on the identification information of the multimedia content contained in the decoding request signal. This playback encrypted information decoding and the playback decoding information may include information generated by a symmetric key algorithm, or an asymmetric key algorithm.

In addition, the server (130) may access the advertisement content that matches the content of the multimedia content or metadata. For this purpose, server (130) may store information about the content information or the metadata of the multimedia content to the database. Server (130) may access the advertisement content using the information such as the information content of the multimedia content or title, content information, character, location, duration, resolution, bit rate, codec information, GOP information corresponding to the metadata, content or index information on time slot for each scene in multimedia content.

On the other hand, when the content information or the metadata of the multimedia content has not yet been stored in the server (130), the server (130) extracts information such as multimedia title, content plot, characters, places corresponding to the content information of the multimedia content from multimedia content, or extracts information such as the playback time, resolution, bit rate, codec information, or GOP information corresponding to the metadata of the multimedia content, content plot for time slot of each scene, or index information. Then, the server (130) accesses the advertisement content using the extracted content information or metadata of multimedia content and may be synthesized accessed the advertisement content and multimedia content. However, if the advertisement content is stored on a Portable storage medium (100), the access procedure for the advertisement content server (130) may be omitted.

After step S404, the server (130) sends the accessed playback decoding information and advertisement content to the computing device (120) (S406). The server (130) may transmit the playback decoding information or advertisement content through a wired or wireless network to the computing device (120).

Figure 5:
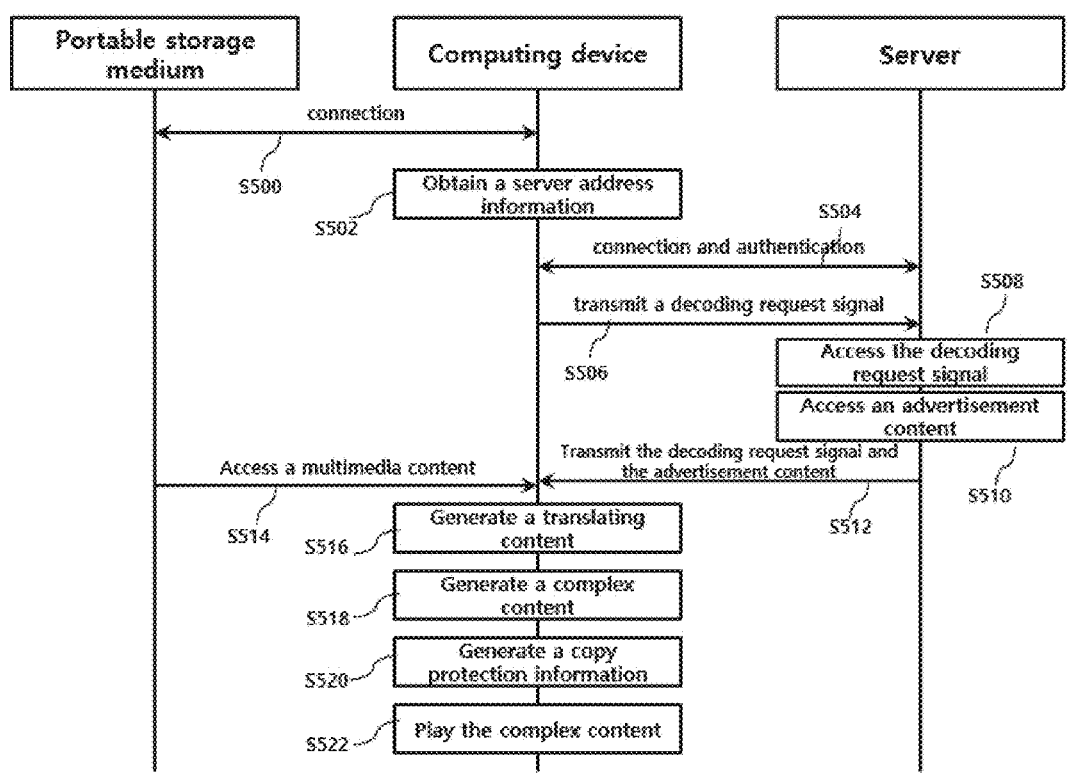
FIG. 5 is a flow chart to components to present a method of providing multiple content including adverting content according to another embodiment of the present invention.

FIG. 5 is a process flow diagram for describing a method of providing the complex content including the advertisement content according to the present invention.

When Portable storage medium (100) access to the server (130) to provide the playback decoding information for the multimedia content (S500), the computing device (120) obtains the address information of server which provides the playback decoding information for multimedia content stored in Portable storage medium (100) (S502). Then, the computing device (120) performs an authentication process with the server (130) through the network connection (S504). If the authentication process is valid, the computing device (120) transmits the decoding request signal to the server (130) (S506). Server (130) accesses the playback decoding information corresponding to the identification information of the multimedia content included in the received request signal decoding from the database (S508), and also accesses the advertisement content corresponding to the multimedia content (S510). However, the process of accessing the advertisement content (S510) may be omitted. Server (130) transmits the accessed playback decoding information and/or advertisement content to the computing device (120) (S512). If the playback decoding information and/or advertisement content is received, the computing device (120) accesses to multimedia content (S514), and decodes to be played multimedia content by combining the playback decoding information on the accessed multimedia content. Then, the computing device (120) synthesizes the decoded multimedia content and the translating content (S516). However, the process of synthesizing the multimedia content and the translated content may be omitted (S516). Computing device (120) synthesizes the decoded multimedia content and advertisement content to generate a complex content (S518). At this time, the computing device (120) may synthesize a copy protection information in the generated complex content (S520). Then, the computing device (120) reproduces a synthesized complex content (S522).

FIGS. 6 to 9b are reference diagrams illustrating playing of the resulting complex content according to the procedure shown in FIG. 5. In the case of a Portable storage medium connected to a computing device, which illustrates a situation in which complex content are generated and reproduced on a computing device.

Figure 6:
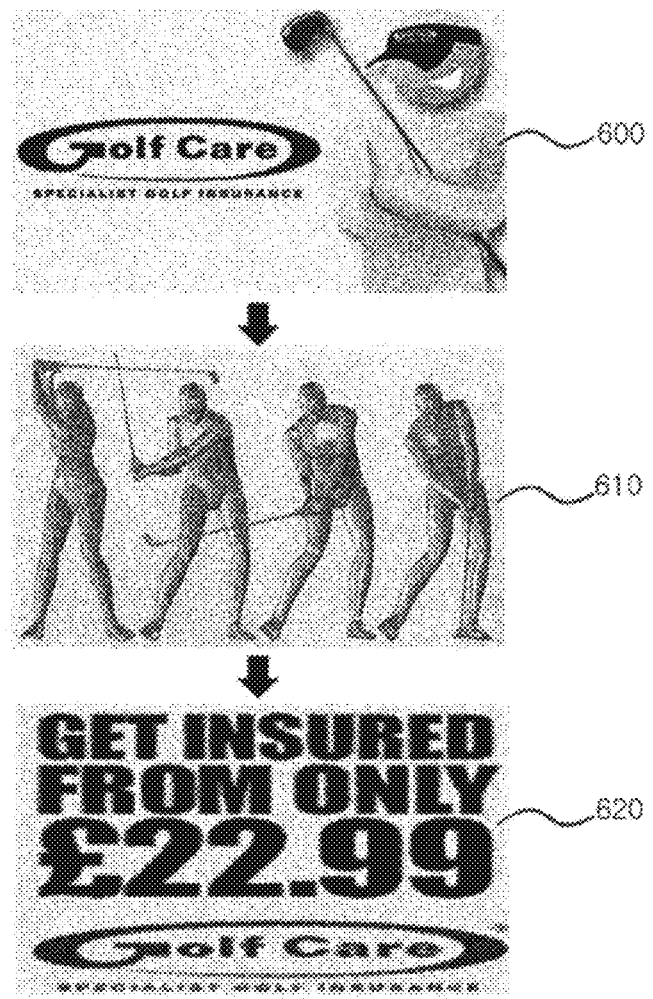
FIG. 6 to 9b are a reference diagram illustrating playing of the complex content produced in accordance with the procedure shown in FIG. 5 according to another embodiment of the present invention.

Referring to FIG. 6, as it illustrates the "Golf Lesson" as multimedia content, advertisement content (600) is reproduced before the multimedia content from the complex content, after that, the multimedia content (610 and 620) are reproduced. The playback start time of the advertisement content is located before playing of the multimedia content. Then, after playing of the multimedia content (610 and 620) is finished, the advertisement content (630) is reproduced. In addition, the advertisement content (622) associated with the club used in the golf lesson of current video (for example, iron or a driver) may be played with the multimedia content. In addition, it may provide a multimedia content in various languages as well as a combination of audio files by synthesizing the translating content (624) associated with the content of the multimedia content.

Figure 7:
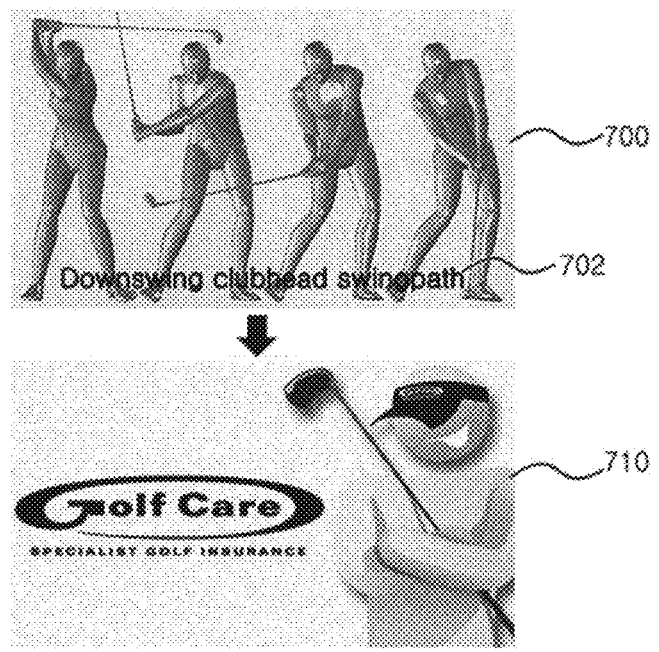

Referring to FIG. 7, as it illustrates the "Golf Lesson" as a multimedia content (700, 710, 720), advertisement content (730, 740) is played after the end of the multimedia content (700, 710, 720) That is possible to play the advertisement content at any one of position of before the start of, during, or after the multimedia content according to the advertiser intention or favor of customers (targeted customers). However, here, the position at which the advertisement content is inserted in the middle of playback of the multimedia content will be vary according to need.

Figure 8A:
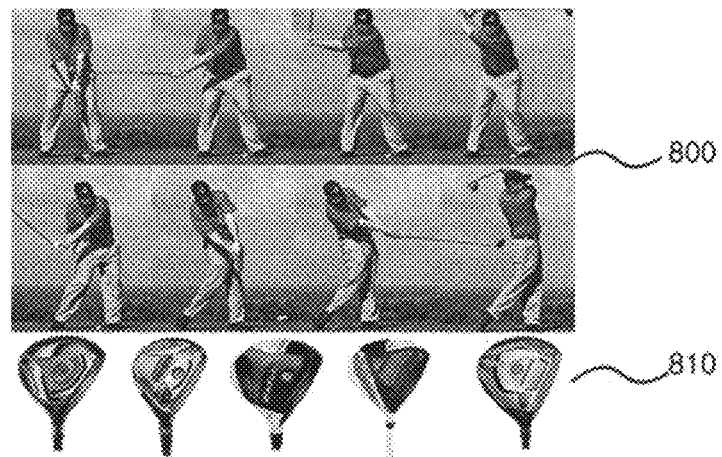
Figure 8B:
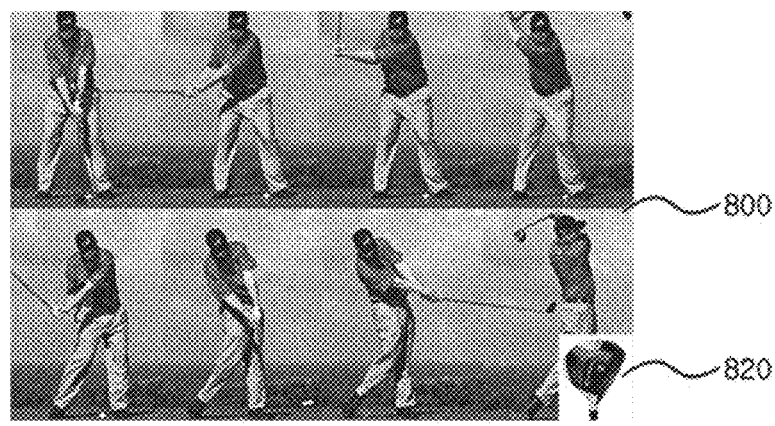

Referring to FIGS. 8*a* to 8*b*, when the multimedia content corresponding to "Golf Lesson" (800) is continuously reproduced, at the time in progress of lesson for the driver club in "Golf Lesson" (or frame), the advertisement content (810, 820) corresponding to the information or the product information for the driver has been played. This can cause more effective advertisement that a lot of customers are interested for the driver club and easily see the product visually. The exposing method for advertisement content can be implemented as one of the grouping advertisement (810) by each category related products as shown in FIG. 8*a*, targeted exposal (820) of single product consisting on sole information about currently using club as shown in FIG. 8*b*, or exposal of each club type.

Figure 9A:
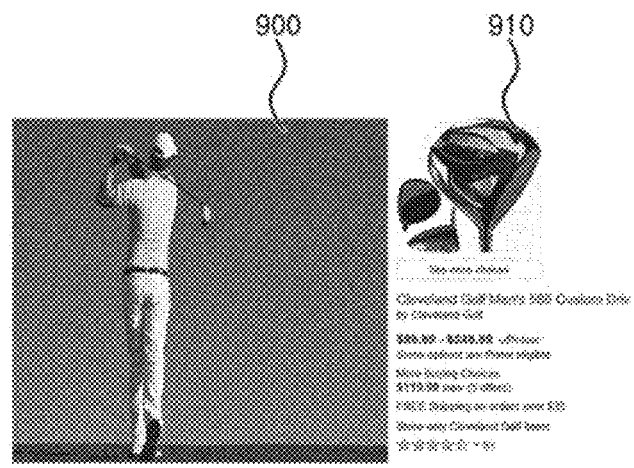
Figure 9B:
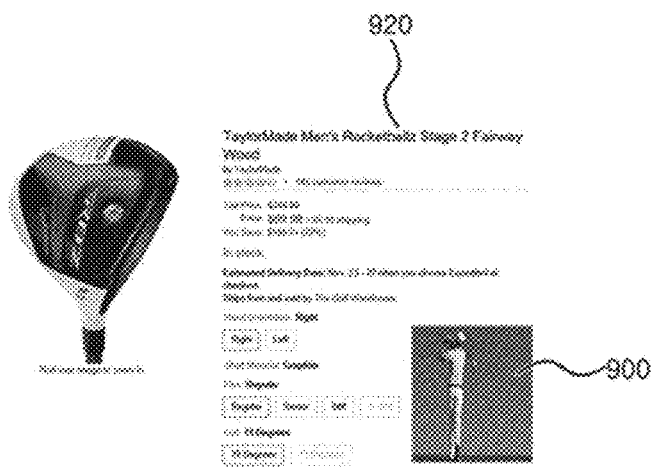

Referring to FIGS. 9*a* and 9*b*, in the case detailed information about the product exposed in FIG. 8*a* or FIG. 8*b* is selected via the computing device, a separate advertisement content is played and is displayed detail information. According to FIG. 9*a*, the multimedia content (900) and advertisement content (910) is reproduced and displayed through a split screen. In addition, according to FIG. 9*b*, the multimedia content (900) and advertisement content (920) is reproduced and displayed through a duplicate screen. In this case, if URL address of the advertisement server for an advertisement content is selected, advertisement servers or web page connected with advertisement server linked to the URL address may be displayed.

Figure 10:
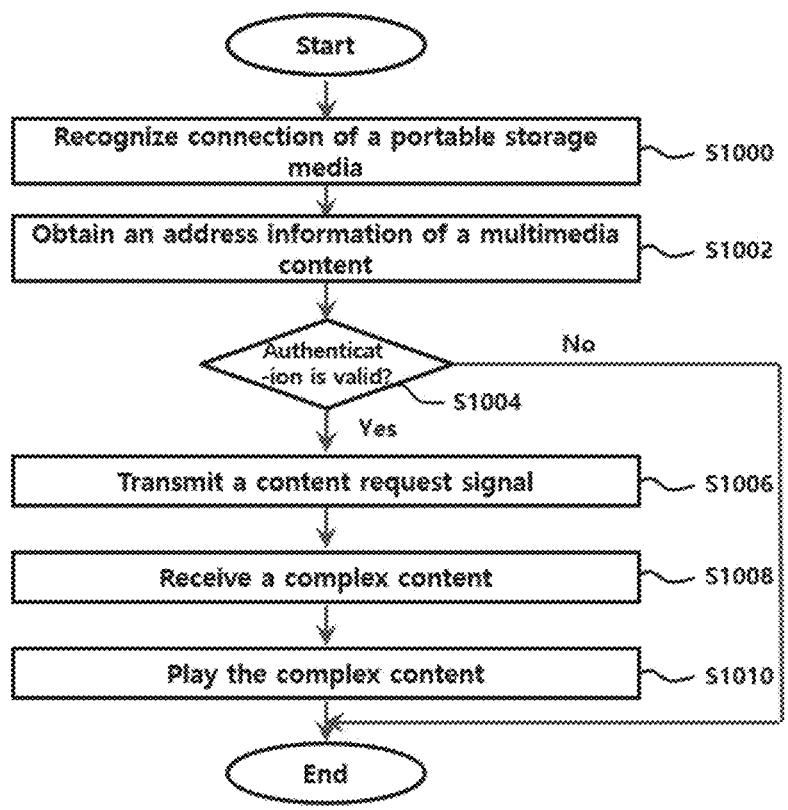
FIG. 10 is a flow chart to present a method of providing multiple content including adverting content according to another embodiment of the present invention.

FIG. 10 is a flowchart illustrating the method of providing the complex content including the advertisement content according to another embodiment of the present invention. It discloses method of providing the complex content performed in a computing device (120) connected with portable storage medium (100).

First, the computing device (120) recognizes the connection of the Portable storage medium (100) (S1000). Portable storage medium (100) is inserted into the connection port of the computing device (120), or in the case of connection via the interface module, the computing device (120) is aware of an event signal according to the connection of the Portable storage medium (100).

After step S1000, the computing device (120) obtains content address information on the multimedia content from the Portable storage medium (100) (S1002). Portable storage medium (100) may store the content and address information for the multimedia content. Content address information may include network address (for example, URL (uniform resource locator) address), or identification information of the multimedia content server that stores the multimedia content.

After step S1002, the computing device (120) performs an authentication procedure to access the server (130) corresponding to the obtained content address information (S1004). The computing device (120) transmits the information about the ID and password entered by the user via the computing device (20) to the server (130). The server (130) determines the validity of the authentication process on the basis of the ID and password transmitted from the computing device (120). However, the authentication process described above is not necessarily required for the procedure, it may be omitted to perform the authentication process as needed.

In step S1004, if the authentication process is valid, the computing device (120) transmits a content request signal for the multimedia content to the server (130) corresponding to the content address information (S1006). Here, the content request signal may include identification information of the multimedia content. The server (130) may access the advertisement content corresponding to multimedia content, and the multimedia content corresponding to identification information according to the reception of the content request signal. Then, after the server (130) generates complex content by synthesizing the accessed multimedia content and advertisement content, the generated complex content is transmitted to the computing device (120).

After step S1006, the computing device (120) receives a complex content from the server (130) (S1008). The received content may be a complex content contained the translated content for the multimedia content. In addition, the received content may be a complex content contained the advertisement content matching the content or metadata of the multimedia content. In addition, the received content may be a complex content contained the copy protection information for preventing illegal copying of the complex content.

After the step S1008, the computing device (120) reproduces the received complex content (S1010). At this time, the computing device (120) can perform network connection operation with advertisement server providing advertisement content during playing of complex content.

Advertisement content may include a network address of the advertisement server that provides advertisement content. Advertisement servers are linked by a network addresses. Accordingly, if the network address of the advertisement server selected by the user during playing of the complex content in the computing device (120), network connection operation to the advertisement server may be performed.

Figure 11:
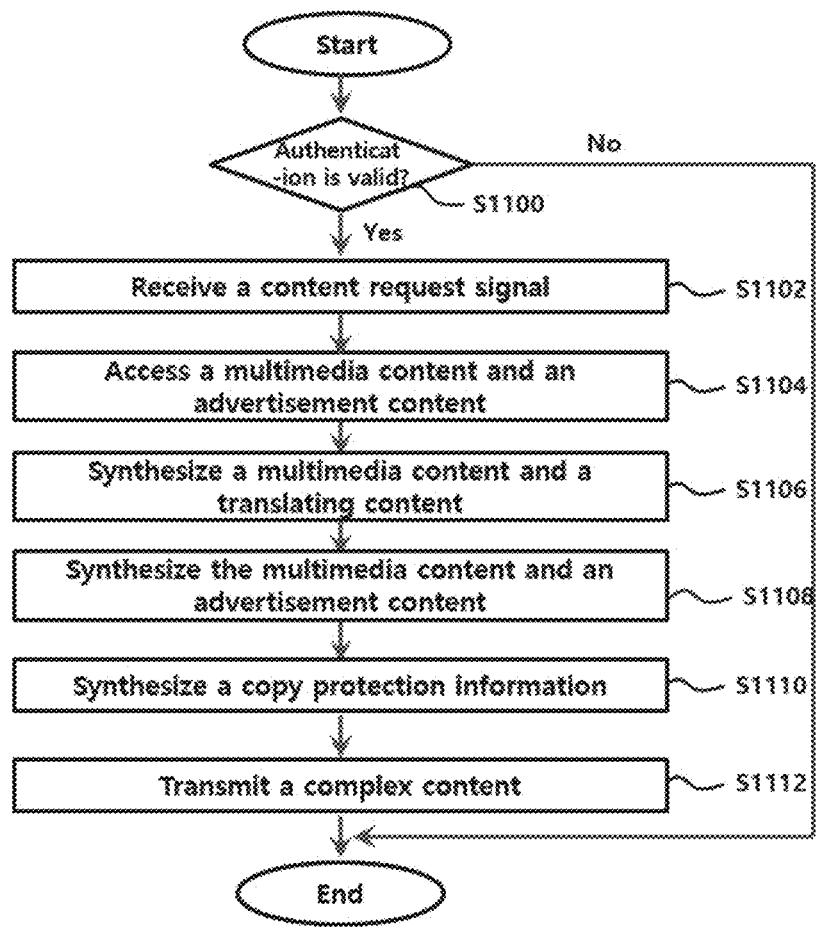
FIG. 11 is a flow chart to present a method of providing multiple content including adverting content according to another embodiment of the present invention.

FIG. 11 is a flowchart illustrating a method for providing the complex content including the advertisement content according to another embodiment of the present invention, and discloses a method for providing the complex content performed by the server associated with computing device (120).

The server (130) performs an authentication procedure for the computing device (120) accessing to the server (130) (S1100). If user inputting the user ID and a password are sent from the computing device (120) to server (130), the server (130) compares the previously registered information with the transmitted ID and password for the authentication process. The previously registered information and the received ID and password are determined to match, the server (130) transmits a response message indicating that the authentication process is valid to the computing device (120). However, the authentication process described above is not necessarily required for the procedure, it may be omitted to perform the authentication process as needed.

After step S1100, if the authentication process is valid, the server (130) receives the decoding request signal from the computing device (120) (S1102). Decoding request signal may include identification information for identifying the multimedia content.

After step S1102, the server (130) may access the advertisement content corresponding to the playback decoding information and/or multimedia content requested by the decoding request signal (S1104). Server (130) stores information about the playback decoding of information and advertisement content to a database. Server (130) may access the playback decoding information based on the identification information of the multimedia content contained in the decoding request signal. In addition, the server (130) may access the advertisement content that matches the content of the multimedia content or metadata. For this purpose, server (130) may store information about the content information or the metadata of the multimedia content to the database. Server (130) may access the advertisement content using the information such as the information content of the multimedia content or title, content information, character, location, duration, resolution, bit rate, codec information, GOP information corresponding to the metadata, content or index information on time slot for each scene in multimedia content.

On the other hand, when the content information or the metadata of the multimedia content has not yet been stored in the Portable storage medium (100) or is not provided from the terminal (120) or the server (130), computing device (120) extracts information such as multimedia title, characters, places corresponding to the content information of the multimedia content from multimedia content, or extracts information such as the playback time corresponding to the metadata of the multimedia content, resolution, bit rate, codec information, GOP information, the time slot information for each scene, or index information. Then, the computing device (120) accesses the advertisement content using the extracted content information or metadata of multimedia content and may be synthesized accessed the advertisement content and multimedia content.

After step S1104, the sever (130) synthesizes the decoded multimedia content and the translating content (S1106). The server (130) may synthesis the multimedia content and translating content using the synchronization information of multimedia content and translating content. For this purpose, the synchronization information of multimedia content and translating content may previously registered in database of server (130). However, the process of synthesizing the multimedia content and the translated content may be omitted.

After the step 1106, the server (130) may synthesize the accessed the advertisement content and the multimedia content. For synthesizing the advertisement content and the multimedia content, the server (130) determines playback time and/or duration of the advertisement content matching the content information or the metadata of the multimedia content, and it can be synthesized in the multimedia content and advertisement content according to the determined result. Server (130) synthesizes the advertisement content and multimedia content using the information such as the title information content of the multimedia content, content information, character, place, playback time information, content or index information on time slot for each scene in multimedia content as metadata information.

After the step 1108, server (130) synthesizes the complex content synthesized multimedia content and advertisement content with the copy protection information. Illegal copying may be prevented by inserting the copy protection information to the multimedia content such as educational content, learning lessons, and the relevant content, or the display may be displayed using a dedicated content player.

Server (130) may generate the copy protection information to synthesize the complex content. Server (130) converts the copy protection information in the same format as the complex content. As the format of the multimedia content is classified by the audio content, still image content, and video content, sever (130) may convert the copy protection information synthesized with the multimedia content so that do corresponding this format. After that, the server (130) synthesizes the converted copy protection information and the complex content. Server (130) may synthesize the copy protection information converted as the same format as the multimedia content to digital content with watermarking technique and the like. In that the process for synthesizing a copy protection information from the server (130) corresponds to the synthesis of the copy protection information in a computing device (120) disclosed in FIG. 3 described above, a detailed description thereof will be omitted. However, the process of synthesizing the complex content and copy protection information may be omitted, if necessary.

After step S1110, the server (130) transmits the synthesized complex content to the computing device (120) (S1112). The server (130) may send the complex content through a wired or wireless network to the computing device (120).

Figure 12:
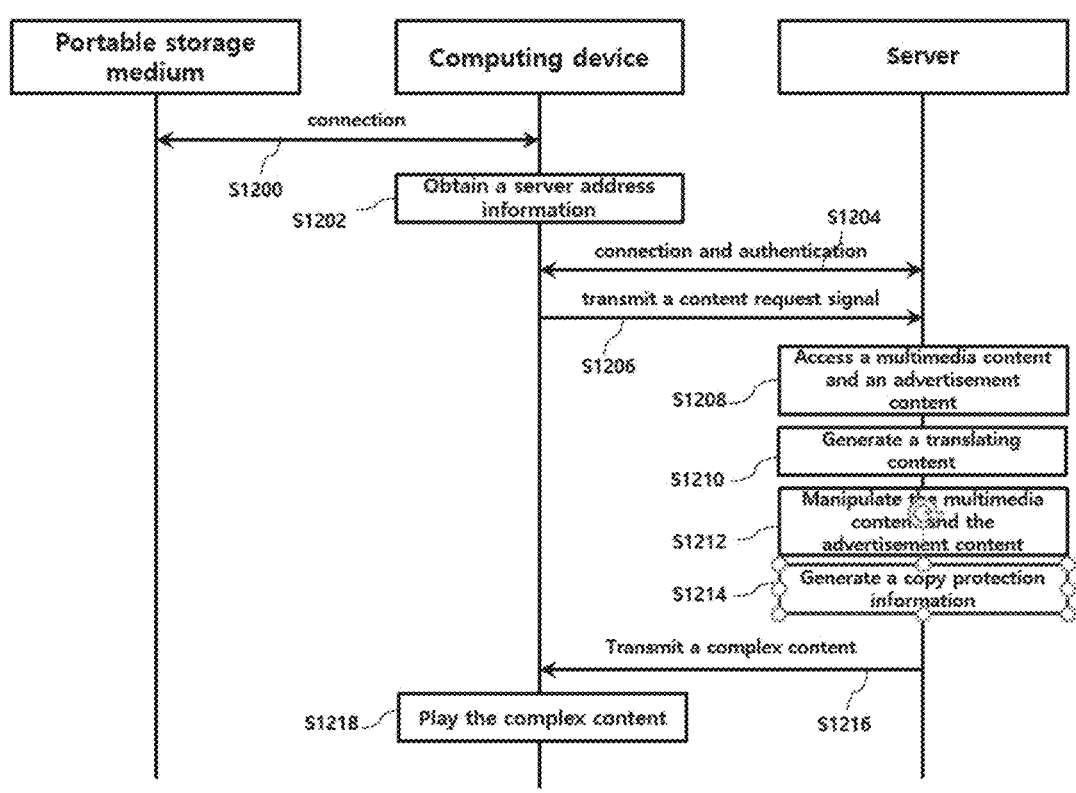
FIG. 12 is a flow chart to components to present a method of providing multiple content including adverting content according to another embodiment of the present invention.

FIG. 12 is a flowchart of method for providing each component for explaining the complex content including the advertisement content according to the present invention When the removable storage medium (100) is connected to the computing device (120) (S1200), computing device (120) obtains the content address information for the multimedia content stored in the removable storage medium (100) (S1202). Then, the computing device (120) performs an authentication process with the server (130) and the network connections corresponding to the content address information (S1204). If the authentication process is effective, the computing device (120) transmits the content request signal to the server (130) (S1206). Server (130) accesses the multimedia content corresponding to the identification of the multimedia content included in the received content request signal from the database, and accesses to the advertisement content corresponding to the multimedia content (S1208). In addition, the server (130) accesses the translating content corresponding to multimedia content, and synthesize the accessed translated content and multimedia content (S1210). The process for synthesizing the translated content may be omitted. Server (130) synthesizes the accessed multimedia content and the advertisement content (S1212). In addition, the server (130) synthesizes the copy protection information in the synthesized complex content in the multimedia content and the advertisement content (S1214). However, the process of synthesizing a copy protection information may be omitted. Server (130) transmits the generated complex content to the computing device (120) (S1216). Then, the computing device 20' reproduces the received content from the server (S1218).

According to an embodiment of the present invention, a method of providing complex content can effectively provide various particular products and image advertisement of company corresponding to advertisement contents to targeted customers by playing multimedia contents including complexed various advertisement contents. The multimedia contents may include such as sports lesson, education contents, and sightseeing contents for main theme, and may be stored in portable storage medium.

That is, since the portable storage medium storing the multimedia contents is provided to targeted customers having attention identical or similar to the multimedia contents, the adverting contents corresponding to the multimedia contents is provided to main customers, merchant customers, or targeted customers, not general persons.

In addition, a method of providing may naturally recognize the targeted customers to the advertisement contents by matching the advertisement contents to contents title or products in scene according to analogous map and playing the matched advertisement contents.

In addition, a method provides optimized advertisement contents to meet customer's needs by providing advertisement contents searched online corresponding to image information or audio information of the multimedia contents in real-time.

The term "unit" used in this embodiment of the removable storage medium according to the present invention means a software or hardware component, such as FPGA or ASIC, and "unit" performs certain tasks. However, "unit" is not meant to be limited to software or hardware. "unit" may be configured so that the storage medium that can be addressed may be configured to play one or more processors. Therefore, an example as "unit" are software components, with the same components, object-oriented software components, class components and task components, processes, functions, attributes, procedures, subroutines, segments include drivers, firmware, microcode, circuitry, data, databases, data structures, tables, arrays, and variables in the program code. The functionality provided for in the components and "unit" may be combined into fewer components and "unit" further separated into additional components and the "unit". In addition, the components and "unit" may be implemented so as to play one or more CPU in a device or security While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for providing a complex content including a multimedia content and an advertisement content related to the multimedia content, which is operated by a computing device connected to a portable storage medium storing the multimedia content that is produced for a particular customer targeted, the method comprising:
   recognizing an event of connection with the portable storage media, medium into a connection port of the comp tin device, wherein the portable storage medium includes the multimedia content, address information of a server that provides decoding information to play the multimedia content by a plug-and-play, a user identification (ID), and a password;
   performing an authentication procedure to access the server by sending the user ID and the password to the server;
   transmitting automatically a decoding request signal including content information or metadata of the multimedia content and requesting the decoding information to be provided by the server based on the address information of the server in response to the event of connection with the portable storage medium, if the authentication is valid;
   receiving the decoding information from the server, in response to the decoding request signal;
   reading the multimedia content from the portable storage media based on the decoding information;
   receiving the advertisement content that is matched with the content information or the metadata of the multimedia content from the server;
   generating the complex content by combining the multimedia content and the advertisement content based on the decoding information on the computing device;
   generating copy protection information for inhibiting unauthorized copying of the complex content; and
   playing the complex content on the computing device.

2. The method of claim 1, wherein the step of generating the complex content comprises:
   manipulating the received advertisement content and the multimedia content stored in the portable storage medium.

3. The method of claim 1, wherein the advertisement content corresponding to the multimedia content is determined based on at least one of metadata contained in the multimedia content, playback position information, and playback time information.

4. The method of claim 1, wherein the step of generating the complex content includes inserting the received advertisement content into one part of a content screen area of the multimedia content.

5. The method of claim 1, wherein the method of providing the complex content including the advertisement content further comprises;
   inserting a translating content of the multimedia content into the multimedia content; and
   manipulating the multimedia content including the translating content and the advertisement content.

6. The method of claim 1, wherein the step of generating copy protection information comprises:
   generating a copy protection information for preventing unauthorized copying of the complex content; and
   inserting the copy protection information into the complex content.

7. The method of claim 1, where generating the copy protection information comprises:
   generating the copy protection information to be inserted into the complex content;
   converting the copy protection information into a format same as that of the complex content; and
   inserting the converted copy protection information into the complex content.

8. The method of claim 7, wherein converting the copy protection information into a format same as that of the complex content comprises:
   converting the copy protection information to the format of the complex content wherein the complex content comprises any one of the audio content, still image content and video content.

9. The method of claim 1, wherein the advertisement content comprises a network address of an advertisement server providing the advertisement content, and
   when the advertisement server is linked by the network address, the advertisement content performs to connect the advertisement server to the network address during playing of the complex content.

* * * * *